US011983408B2

(12) United States Patent
Subramanian et al.

(10) Patent No.: US 11,983,408 B2
(45) Date of Patent: May 14, 2024

(54) BALLOONING FOR MULTI-TIERED POOLED MEMORY

(71) Applicant: Intel Corporation, Santa Clara, CA (US)

(72) Inventors: Rasika Subramanian, Hillsboro, OR (US); Lidia Warnes, Roseville, CA (US); Francesc Guim Bernat, Barcelona (ES); Mark A. Schmisseur, Phoenix, AZ (US); Durgesh Srivastava, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/142,942

(22) Filed: May 3, 2023

(65) Prior Publication Data

US 2023/0333738 A1 Oct. 19, 2023

Related U.S. Application Data

(63) Continuation of application No. 16/914,124, filed on Jun. 26, 2020, now Pat. No. 11,681,439.

(51) Int. Cl.
*G06F 3/06* (2006.01)

(52) U.S. Cl.
CPC .......... *G06F 3/0608* (2013.01); *G06F 3/0631* (2013.01); *G06F 3/0665* (2013.01); *G06F 3/0673* (2013.01)

(58) Field of Classification Search
CPC .... G06F 3/0608; G06F 3/0673; G06F 3/0665; G06F 3/0631
See application file for complete search history.

(56) References Cited

U.S. PATENT DOCUMENTS 9,507,540 B1 * 11/2016 Adogla ............... G06F 9/45558
9,910,774 B1 * 3/2018 Gupta .................. G06F 12/023
2015/0293881 A1 * 10/2015 Raikin .................... H04L 67/02 709/212
2016/0262823 A1 * 9/2016 Aklog .................... A61B 18/04
2017/0017401 A1 * 1/2017 Grube .................. G06F 3/0685
2018/0004558 A1 * 1/2018 Das Sharma ....... G06F 13/1663
2019/0171473 A1 * 6/2019 Hildenbrand ....... G06F 9/45558
2019/0171486 A1 * 6/2019 Hildenbrand ......... G06F 9/5077
2020/0034056 A1 * 1/2020 Hildenbrand ......... G06F 3/0664

(Continued)

OTHER PUBLICATIONS

Final Office Action from U.S. Appl. No. 16/914,124 dated Jun. 7, 2022, 20 pgs.

(Continued)

*Primary Examiner* — Sean D Rossiter
(74) *Attorney, Agent, or Firm* — Essential Patents Group, LLP

(57) ABSTRACT

An embodiment of an electronic apparatus may include one or more substrates, and logic coupled to the one or more substrates, the logic to allocate a first memory portion to a first application as a combination of a local memory and remote memory, wherein the remote memory is shared between multiple compute nodes, and manage a first memory balloon associated with the first memory portion based on two or more memory tiers associated with the local memory and the remote memory. Other embodiments are disclosed and claimed.

20 Claims, 8 Drawing Sheets

20

21: Allocate a first memory portion to a first application as a combination of a local memory and remote memory, wherein the remote memory is shared between multiple compute nodes 22: Manage a first memory balloon associated with the first memory portion based on two or more memory tiers associated with the local memory and the remote memory

B C D

(56) References Cited

U.S. PATENT DOCUMENTS

2020/0363975 A1* 11/2020 Subramanian ...... G06F 9/45541

OTHER PUBLICATIONS

Non-Final Office Action from U.S. Appl. No. 16/914,124 dated Aug. 6, 2021, 13 pgs.
Non-Final Office Action from U.S. Appl. No. 16/914,124 dated Jan. 24, 2022, 14 pgs.
Non-Final Office Action from U.S. Appl. No. 16/914,124 dated Sep. 27, 2022, 15 pgs.
Notice of Allowance from U.S. Appl. No. 16/914,124 dated Feb. 17, 2023, 7 pgs.

* cited by examiner

BALLOONING FOR MULTI-TIERED POOLED MEMORY

CLAIM OF PRIORITY

This application is a continuation of, and claims priority to, U.S. patent application Ser. No. 16/914,124 filed Jun. 26, 2020 and titled "BALLOONING FOR MULTI-TIERED POOLED MEMORY," which is incorporated herein by reference.

BACKGROUND

Memory pooling may refer to memory management technology for sharing memory among applications or compute nodes. Multi-tier memory management technology may organize memory into two or more tiers according to various storage or performance characteristics associated with the memory, such as capacity, bandwidth, latency, etc. Memory ballooning may refer to memory management technology where memory allocated to one virtual machine may be enlarged by reclaiming memory previously allocated to other virtual machines.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
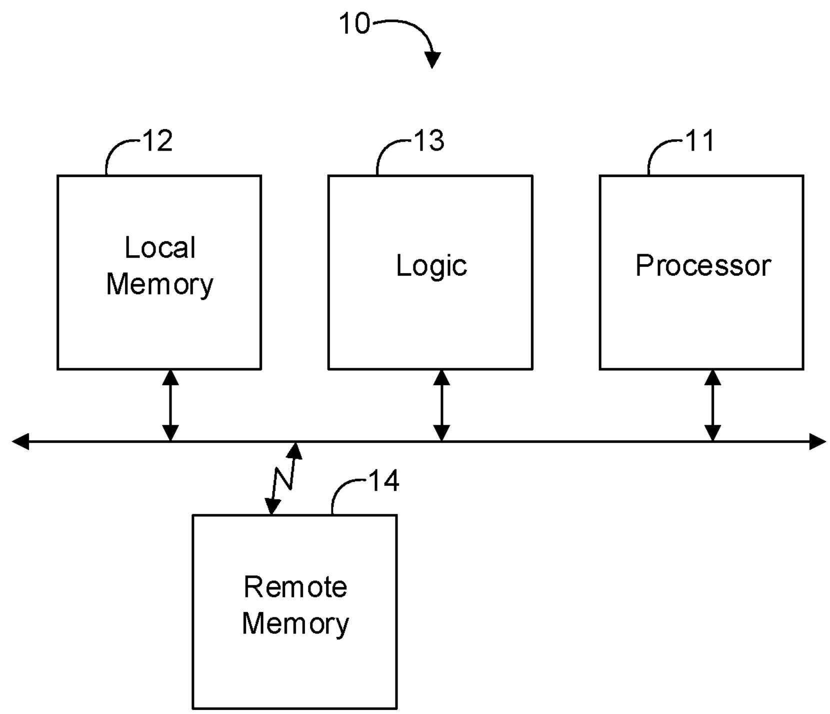
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

With reference to FIG. 1, an embodiment of an electronic system 10 may include a processor 11, a local memory 12 communicatively coupled to the processor 11, and logic 13 communicatively coupled to the processor 11 and the local memory 12. The logic 13 may be configured to allocate a first memory portion to a first application as a combination of the local memory 12 and remote memory 14 (e.g., where the remote memory 14 is shared between multiple compute nodes), and manage a first memory balloon associated with the first memory portion based on two or more memory tiers associated with the local memory 12 and the remote memory 14. In some embodiments, the logic 13 may be further configured to at least partially inflate the first memory balloon when the first application is initialized. Additionally, or alternatively, the logic 13 may be configured to allocate the first memory balloon to a particular memory tier of the two or more memory tiers associated with the local memory 12 and the remote memory 14 based on a performance characteristic associated with the first application. For example, the performance characteristic may correspond to one or more of a service level agreement (SLA) characteristic (e.g., including a service level objective (SLO) for an application, etc.), a quality of service (QoS) characteristic, etc.

In some embodiments, the first application may correspond to a virtual machine (VM), and the logic 13 may be configured to virtually map a first amount of memory for the entire first memory portion for the VM when the VM is initialized, physically map a second amount of memory from the local memory 12 for the VM when the VM is initialized, where the second amount of memory is less than the first amount of memory, and inflate the first memory balloon based on a third amount of memory that remains to be physically mapped for the first portion of memory. Additionally, or alternatively, the logic 13 may be further configured to determine that the first application needs additional memory outside the first memory balloon, determine a preferred memory tier for the additional memory, and identify a second memory balloon associated with a second memory portion to provide the additional memory based on available memory from the second memory balloon in the preferred memory tier. For example, the logic 13 may also be configured to inflate the second memory balloon to free the available memory from the second memory portion, and allocate the freed available memory to the first memory portion for the additional memory.

Embodiments of each of the above processor 11, local memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 11 may include a general purpose processor, a special purpose processor, a central processor unit (CPU), an execution unit, a general purpose controller, a special purpose controller, a memory controller, a storage controller, a microcontroller, etc. In some embodiments, the local memory 12, the logic 13, and/or other system memory may be located in, or co-located with, various components, including the processor 11 (e.g., on a same die).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the local memory 12, persistent storage media, or other system memory may store a set of instructions which when executed by the processor 11 cause the system 10 to implement one or more components, features, or aspects of the system 10 (e.g., the logic 13, allocating the first memory portion to the first application as a combination of the local memory 12 and the remote memory 14, managing the memory balloons based on the two or more memory tiers associated with the local memory 12 and the remote memory 14, etc.).

Figure 2:
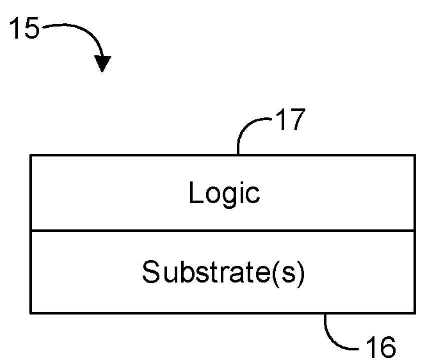
FIG. 2 is a block diagram of an example of an electronic apparatus according to an embodiment.
Figure 3A:
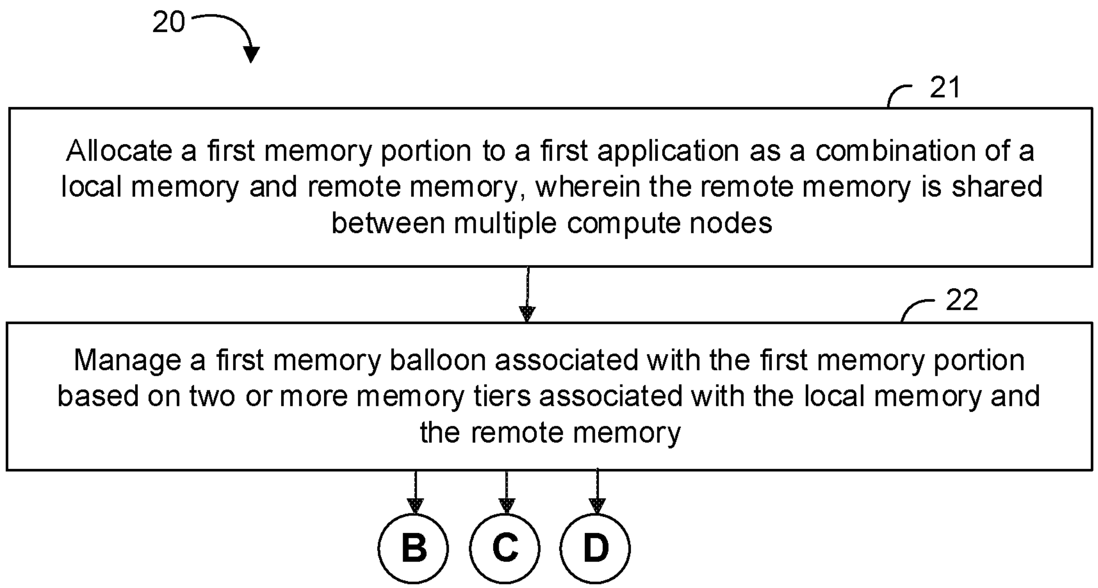
FIGS. 3A to 3D are flowcharts of an example of a method of managing memory according to an embodiment.
Figure 3B:
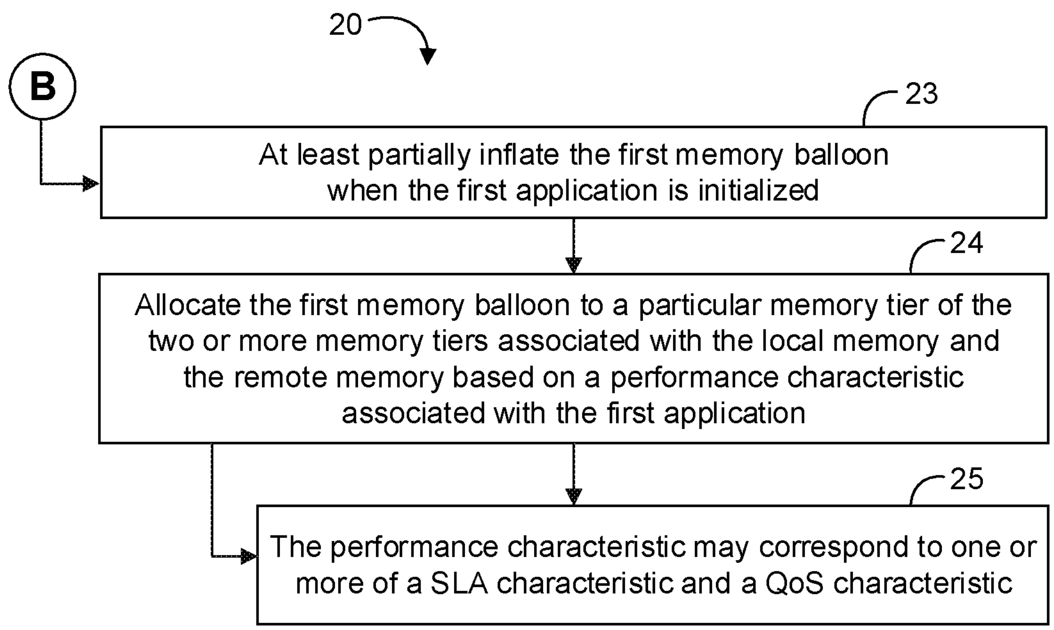
Figure 3C:
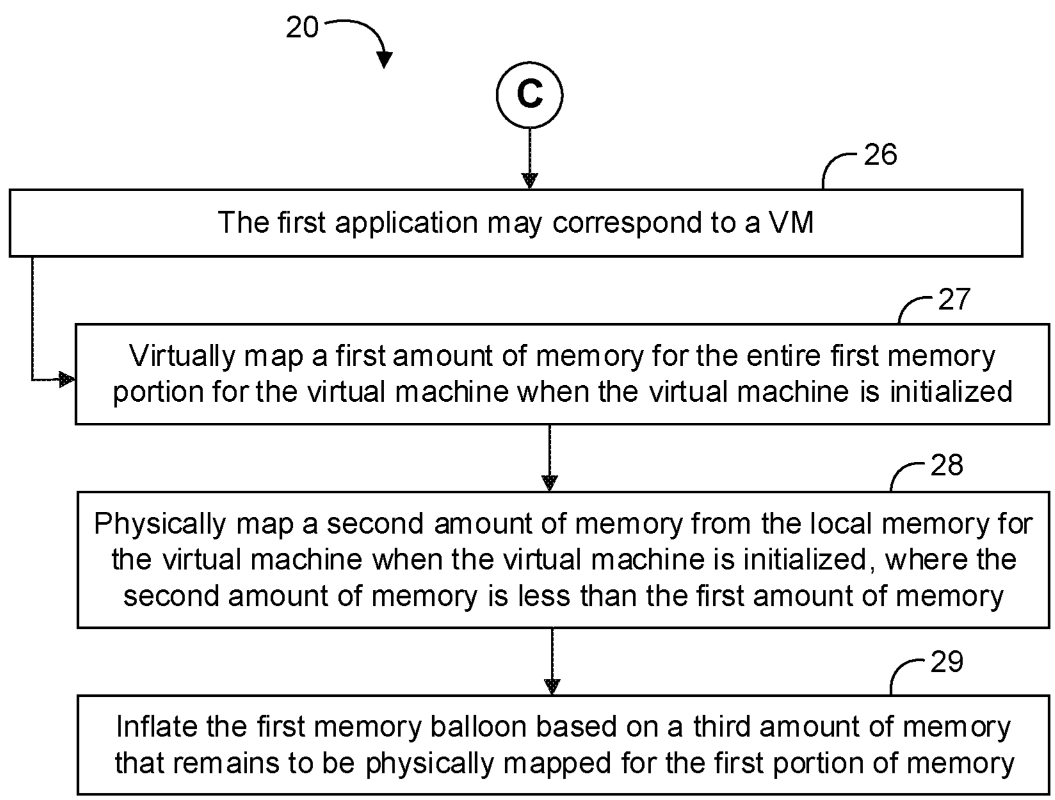
Figure 3D:
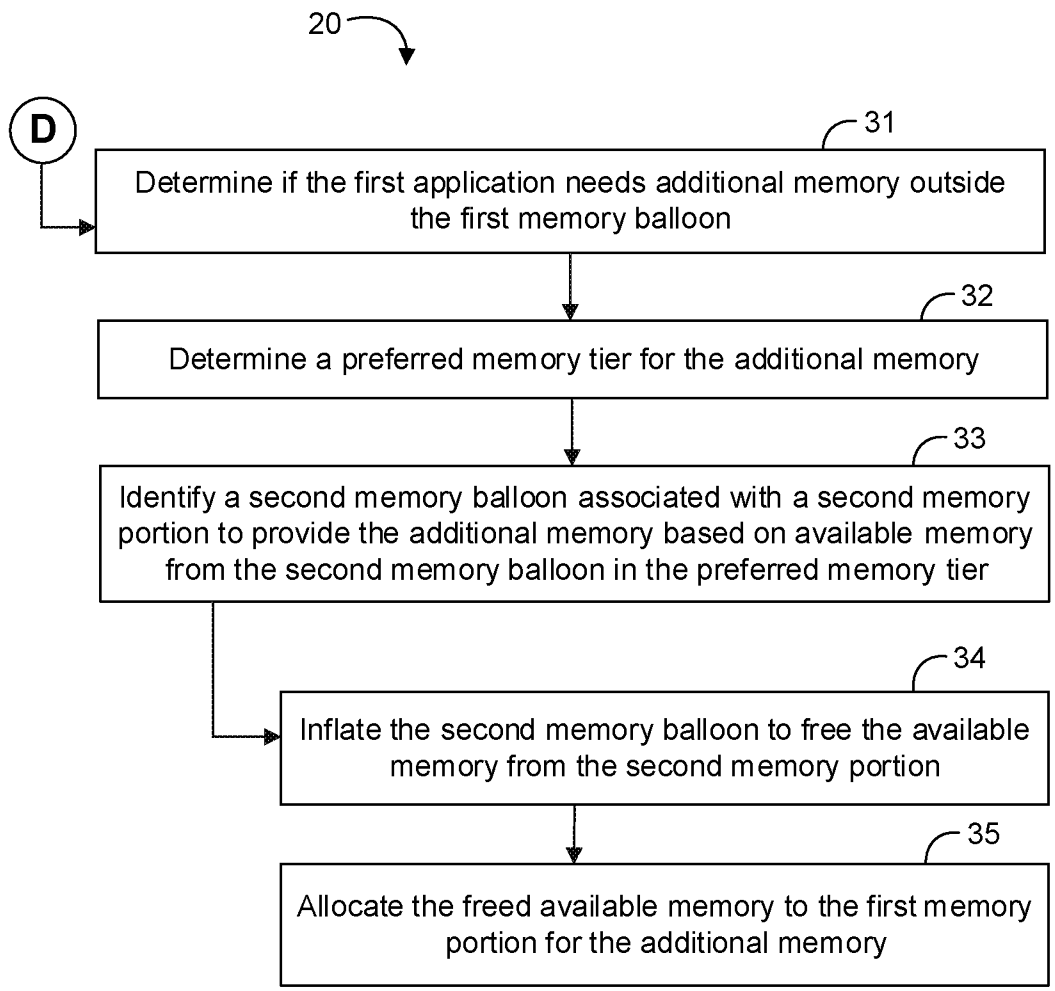

Turning now to FIG. 2, an embodiment of an electronic apparatus 15 may include one or more substrates 16, and logic 17 coupled to the one or more substrates 16. The logic 17 may be configured to allocate a first memory portion to a first application as a combination of a local memory and remote memory, wherein the remote memory is shared between multiple compute nodes, and manage a first memory balloon associated with the first memory portion based on two or more memory tiers associated with the local memory and the remote memory. In some embodiments, the logic 17 may be further configured to at least partially inflate the first memory balloon when the first application is initialized. Additionally, or alternatively, the logic 17 may be configured to allocate the first memory balloon to a particular memory tier of the two or more memory tiers associated with the local memory and the remote memory based on a performance characteristic associated with the first application. For example, the performance characteristic may correspond to one or more of a SLA characteristic, a QoS characteristic, etc.

In some embodiments, the first application may correspond to a virtual machine (VM), and the logic 17 may be configured to virtually map a first amount of memory for the entire first memory portion for the VM when the VM is initialized, physically map a second amount of memory from the local memory for the VM when the VM is initialized, where the second amount of memory is less than the first amount of memory, and inflate the first memory balloon based on a third amount of memory that remains to be physically mapped for the first portion of memory. Additionally, or alternatively, the logic 17 may be further configured to determine that the first application needs additional memory outside the first memory balloon, determine a preferred memory tier for the additional memory, and identify a second memory balloon associated with a second memory portion to provide the additional memory based on available memory from the second memory balloon in the preferred memory tier. For example, the logic 17 may also be configured to inflate the second memory balloon to free the available memory from the second memory portion, and allocate the freed available memory to the first memory portion for the additional memory.

Embodiments of the logic 17 may be implemented in a system, apparatus, computer, device, etc., for example, such as those described herein. More particularly, hardware implementations of the logic 17 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the logic 17 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the logic 17 may be implemented on a semiconductor apparatus, which may include the one or more substrates 16, with the logic 17 coupled to the one or more substrates 16. In some embodiments, the logic 17 may be at least partly implemented in one or more of configurable logic and fixed-functionality hardware logic on semiconductor substrate(s) (e.g., silicon, sapphire, gallium-arsenide, etc.). For example, the logic 17 may include a transistor array and/or other integrated circuit components coupled to the substrate(s) 16 with transistor channel regions that are positioned within the substrate(s) 16. The interface between the logic 17 and the substrate(s) 16 may not be an abrupt junction. The logic 17 may also be considered to include an epitaxial layer that is grown on an initial wafer of the substrate(s) 16.

Turning now to FIGS. 3A to 3D, an embodiment of a method 20 of managing memory may include allocating a first memory portion to a first application as a combination of a local memory and remote memory, wherein the remote memory is shared between multiple compute nodes at block 21, and managing a first memory balloon associated with the first memory portion based on two or more memory tiers associated with the local memory and the remote memory at block 22. Some embodiments of the method 20 may further include at least partially inflating the first memory balloon when the first application is initialized at block 23. Additionally, or alternatively, the method 20 may further include allocating the first memory balloon to a particular memory tier of the two or more memory tiers associated with the local memory and the remote memory based on a performance characteristic associated with the first application at block 24. For example, the performance characteristic may correspond to one or more of a SLA characteristic and a QoS characteristic at block 25.

In some embodiments, the first application may correspond to a VM at block 26, and the method 20 may further include virtually mapping a first amount of memory for the entire first memory portion for the VM when the VM is initialized at block 27, physically mapping a second amount of memory from the local memory for the VM when the VM is initialized at block 28, where the second amount of memory is less than the first amount of memory, and inflating the first memory balloon based on a third amount of memory that remains to be physically mapped for the first portion of memory at block 29. Additionally, or alternatively, some embodiments of the method 20 may further include determining if the first application needs additional memory outside the first memory balloon at block 31, determining a preferred memory tier for the additional memory at block 32, and identifying a second memory balloon associated with a second memory portion to provide the additional memory based on available memory from the second memory balloon in the preferred memory tier at block 33. For example, the method 20 may also include inflating the second memory balloon to free the available memory from the second memory portion at block 34, and allocating the freed available memory to the first memory portion for the additional memory at block 35.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 20 may be implemented on a computer readable medium as described in connection with Examples 22 to 28 below. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology to improve or optimize memory allocation in pooled memory architectures with multi-tiered memory ballooning. Main memory may be overprovisioned and under-utilized, particularly in servers and data centers. For example, main memory may tend to run out of capacity before bandwidth or compute resources. Main memory may involve expensive components and be difficult to expand (e.g., because it may be associated with a SoC). Generally, a memory upgrade requires a platform upgrade and shutting down the server/rack(s)/data center. Memory usage may be difficult to predict (e.g., memory traffic is often bursty), which may result in stranding.

Memory pooling technology and multi-tier memory technology may provide a higher level of flexibility and achieve more scalable and improved memory provisioning schemes. However, some software infrastructure may not be well adapted to memory pooling technology or multi-tier memory technology, which may result in poor memory utilization and/or memory allocation. Some embodiments may advantageously provide memory ballooning technology to improve or optimize memory utilization and/or memory allocation, which may enable better virtualization in pooled memories.

Some embodiments may expand memory ballooning technology to multi-tier memory architectures to provide improved memory management in pooled memory systems and may improve or optimize the utilization of local and pooled memory to overcome one or more of the foregoing problems. Some embodiments may provide an improved balloon driver in a hypervisor and VM (e.g., by expanding the balloons into a pooled memory architecture). Some embodiments may provide more deterministic technology to improve the utilization of local and remote memory, where remote memory is considered to be pooled memory. For example, some embodiments may provide memory ballooning technology to improve or optimize memory utilization by incorporating better allocations to a combination of local and remote memory where the remote memory is shared between multiple compute nodes. The pooled memory architecture itself may also be expanded with features to allow advanced memory ballooning schemes.

In particular, some embodiments may expand the memory/system architecture to support memory ballooning technology in a multi-tier memory architecture. For example, a memory balloon may be deployed for a particular VM in a pooled memory. In some embodiments, respective balloons may be allocated in different tiers of the pooled memory. Advantageously, the system may provide SLA and QoS features attached to each of these locations. For example, different types of balloons may be exposed with different properties depending on the location of where the balloons are created (e.g., which may advantageously provide a wide variety of useful memory management features). Conventional balloon drivers, as might be provided in a hypervisor, VM, etc., may be agnostic to memory pooling and memory tiers (e.g., the balloon driver may be single node only). Advantageously, some embodiments of a balloon driver may expose the memory tiers to overcome ineffective memory allocation in the memory pool tiers (e.g., the balloon driver may better support multi-node memory pooled architectures). By providing a suitable application programming interface (API) from the tiered memory architecture, for example, some embodiments may allow the hypervisor to better decide where and how to allocate balloons. For example, some embodiments of a hypervisor and/or balloon driver may implement or better support SLA and QoS policies, and/or may expose new functionalities and APIs to the users/customers.

Multi-tier memory technology may be utilized to reduce the datacenter total cost of ownership (TCO) and may address a number of memory upgrade problems by decoupling the compute technology from the memory technology life cycle. However, just using the memory pool as overflow banks may result in poor memory utilization which may negate some potential cost advantages associated with multi-tier memory technology. Some embodiments may advantageously provide technology to better utilize local and remote memory simultaneously and also to provide a platform for tenant VM memory affinity in data centers. For example, some embodiments provide technology for a virtualization environment to consider multi-tiered pooled memory policies which are aware of QoS and SLA requirements.

Figure 4:
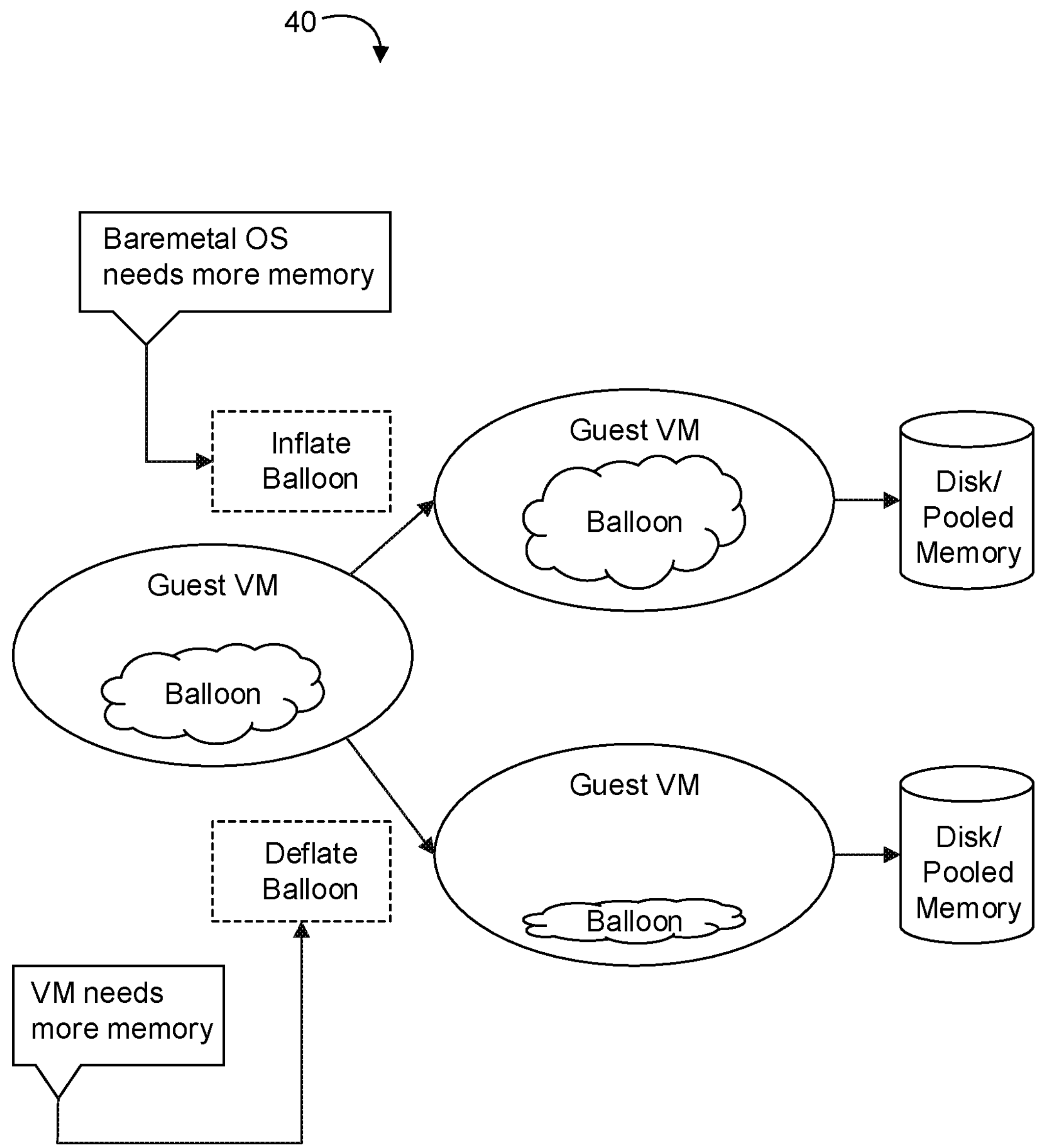
FIG. 4 is a block diagram of an example of a virtualization environment according to an embodiment.

With reference to FIG. 4, an embodiment of a virtualization environment 40 may include a Guest VM with an associated balloon. When the Guest VM is initialized (e.g., or instantiated), the balloon associated with the Guest VM may be partially inflated. If the baremetal OS (e.g., or host OS) needs more memory, the balloon associated with the Guest VM may be inflated (e.g., if the Guest VM has low memory utilization). If the Guest VM needs more memory, the balloon associated with the Guest VM may be deflated. In the case where there are not enough unused physical memory resources relative to the baremetal OS or VM demand, page swaps to storage (e.g., disk and/or pooled memory) may be initiated.

In some environments, a balloon driver may be installed in each guest OS/VM. All of the Guest VMs may be aware of the balloon driver and there may be a mutual agreement between the VM and the hypervisor to provide the balloon driver access to all memory pages of the VM. In general, memory ballooning works based on an assumption that not all the VMs are going to need to use all of their balloon memory capacity at the same time. By monitoring the excess memory in each VM, the hypervisor may satisfy periodic higher memory demands by inflating the balloon of the VMs with low memory utilization (e.g., which blocks those VMs from using the memory capacity in the inflated balloon), reclaiming the memory, and re-allocating the reclaimed memory to the VMs with high memory demand. After a VM completes its high memory demand operation, the balloon associated with the balloon may be inflated to free those memory pages. The balloon driver may then make the hypervisor aware that the pages are free. In the case where there are not enough unused physical memory resources relative to the VM demand, page swaps to storage may be initiated.

In a non-limiting operational example, a tenant may request a VM with 100 GB of memory. In response to the request, the baremetal OS/host OS then instantiates the VM with the 100 GB of memory such that a certain percentage of the memory, which may be referred to as an allocation percentage, is local. The allocation percentage of the memory is virtually and physically mapped to local memory in the node. The remaining memory is managed within an inflated balloon. The balloon memory pages are virtually mapped but not yet physically mapped. The allocation percentage is flexible and may be set by profiling the server for a preferred or ideal percentage depending on, for example, average memory utilization of applications. For conventional memory ballooning, all balloons are deflated at initialization, which may result in poor memory utilization. By partially inflating the memory balloon at initialization, some embodiments may advantageously improve or optimize utilization of pooled memory (e.g., by providing better utilization of local memory capacity and reducing local memory stranding).

As shown in FIG. 4, when the Guest VM requires more memory, the balloon associated with the Guest VM deflates. In some embodiments, deflating the balloon may lead to an evaluation of the SLA of the Guest VM (e.g., or an application associated with a memory balloon in other compute environments). For example, a lookup table may map various SLA characteristics to respective memory tiers. Table 1 shows an example SLA to Memory Allocation table:

TABLE 1

| Application SLA | Memory Allocation |
|---|---|
| 100 ms | Tier 0 Local memory |
| 200 ms | Tier 1 Pooled memory |
| 400 ms | Tier 2 Pooled memory |

In this example, if the SLA is low (e.g., 100 ms as shown in Table 1), then the virtual pages in the balloon are physically mapped to the local memory. If the SLA is higher, the virtual pages in the balloon are physically mapped to corresponding suitable tiers of a remote pooled memory (e.g., Tier 1 for a 200 ms SLA, Tier 2 for a 400 ms SLA, etc.). Some embodiments may initially provide only a percentage of the requested memory to the VM (e.g., less than 100%) and only provide more memory to the VM when needed, which advantageously not only reduces the initial memory utilization (e.g., leading to more local memory being available for newer VMs to be spun up on the machine), but also helps with a more optimized approach of utilizing pooled memory.

Figure 5A:
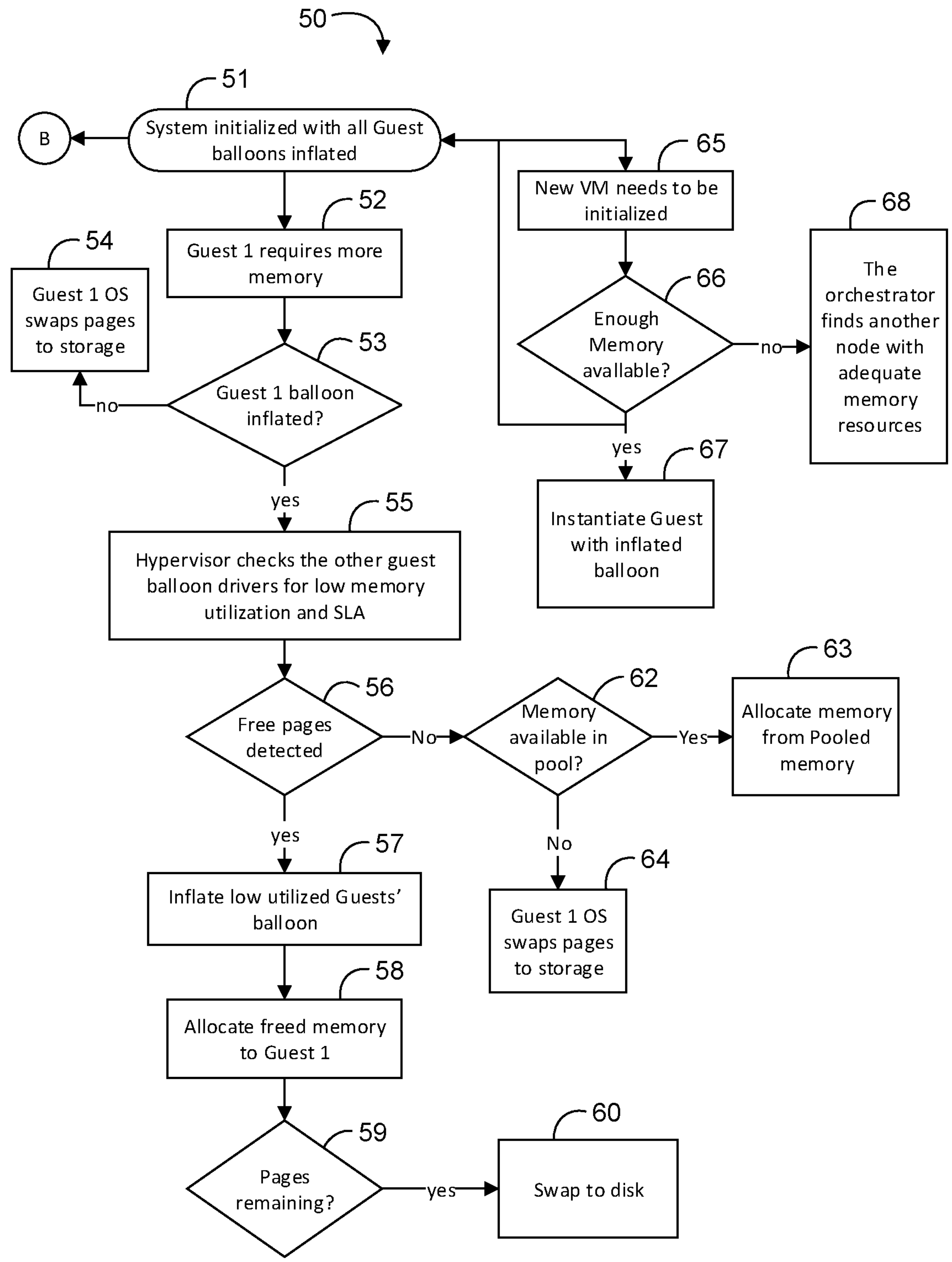
FIGS. 5A to 5B are flowcharts of another example of a method of managing memory according to an embodiment.
Figure 5B:
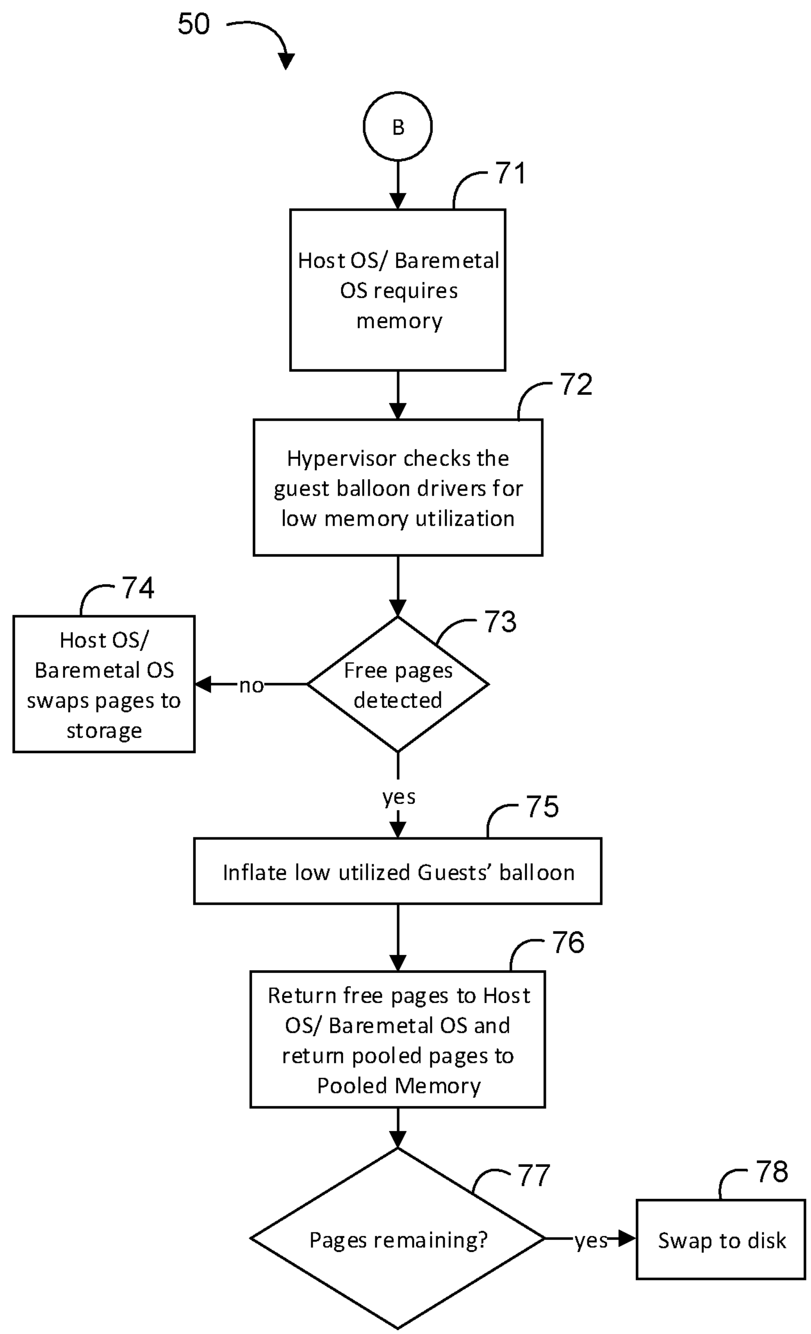

With reference to FIG. 5, an embodiment of a method 50 of managing memory may include initializing a system with all Guest balloons inflated (e.g., at least partially inflated) at block 51. The method 50 may then include determining that Guest 1 requires more memory at block 51 and checking if a balloon associated with Guest 1 is inflated at block 53. If not, the method 50 may include the Guest 1 OS swapping pages to storage at block 54. If so, the method 50 may include a hypervisor checking the other guest balloon drivers for low memory utilization and SLA related information at block 55. The method 50 may then include checking if free pages are detected at block 56 (e.g., that match Guest 1's SLA requirements) and, if so, inflating the low utilized Guests' associated balloon(s) at block 57 and allocating the freed memory to Guest 1 at block 58. After block 58, the method 50 may then include checking if there are any pages remaining at block 59 and, if so, swapping to disk at block 60.

If no free pages are detected at block 56, the method 50 may proceed to checking if memory is available in the memory pool at block 62 and, if so, allocating memory from the pooled memory to Guest 1 at block 63 (e.g., with the tier of the pooled memory selected based on Guest 1's SLA requirements). If not, the method 50 may include the Guest 1 OS swapping pages to storage at block 64.

The method 50 may further include determining that a new VM needs to be initialized at block 65 and checking if enough memory is available at block 66. If so, the method 50 may proceed to instantiating the new Guest with a inflated balloon at block 67. If not, the method 50 may include the orchestrator finding another node with adequate memory resources for the new VM at block 68.

The method 50 may further include determining that the host OS/baremetal OS requires memory at block 71, and the hypervisor checking the guest balloon drivers for low memory utilization at block 72. The method 50 may then check if free pages are detected at block 73 and, if not, the method 50 may proceed to the host OS/baremetal OS swapping pages to storage at block 74. If free pages are detected at block 73, the method 50 may proceed to inflating the low utilized Guests' balloon(s) at block 75, and returning free pages to the host OS/baremetal OS and returning pooled pages to the pooled memory at block 76. After block 76, the method 50 may include checking if there are any pages remaining at block 77 and, if so, swapping to disk at block 78.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 6:
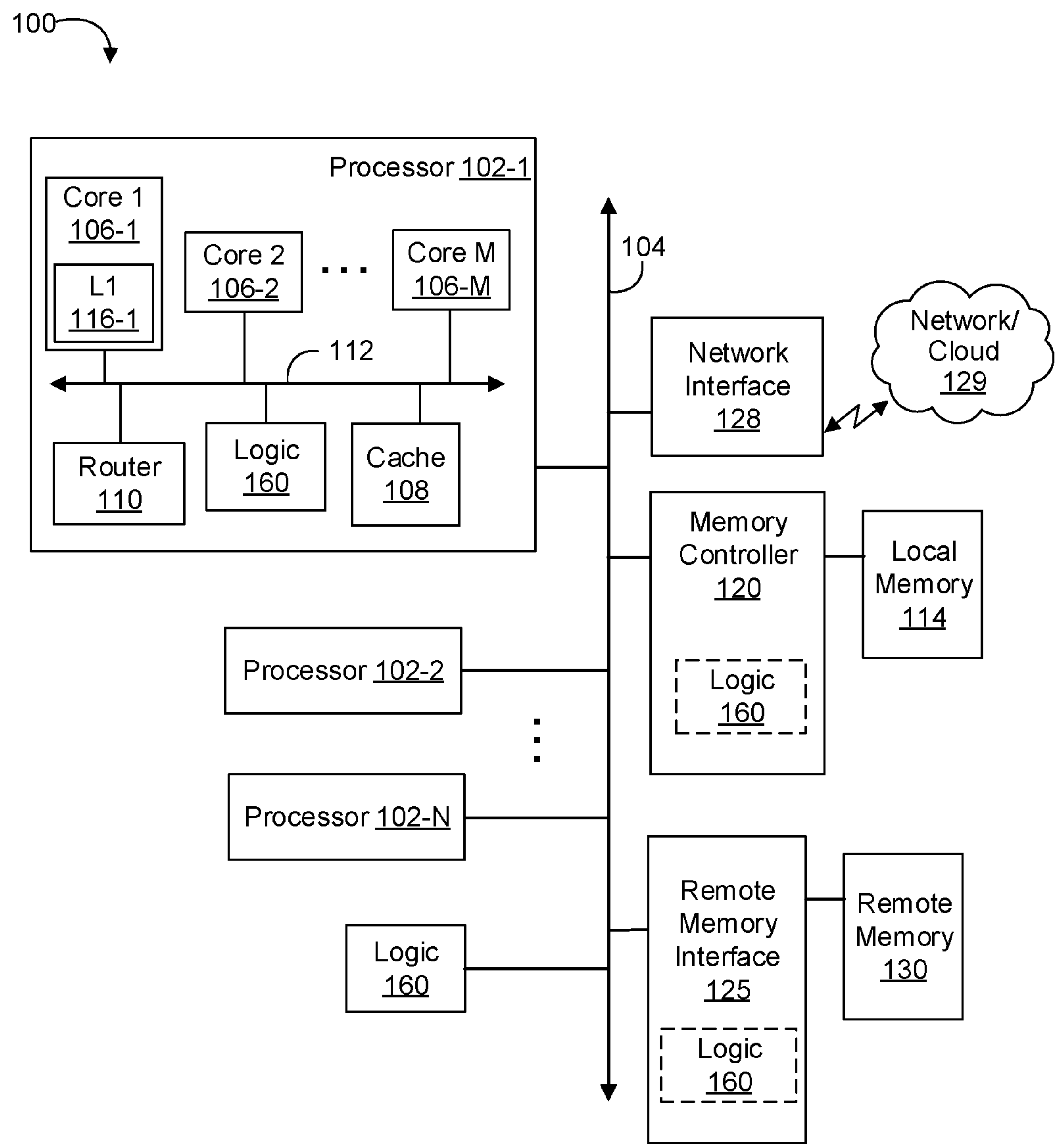
FIG. 6 is a block diagram of an example of a computing system according to an embodiment.

Turning now to FIG. 6, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 160, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a local memory 114 for faster access by the components of the processor 102. As shown in FIG. 6, the local memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 6, the local memory 114 may be coupled to other components of system 100 through a memory controller 120. The local memory 114 may include volatile memory and may be interchangeably referred to as main memory or system memory. Even though the memory controller 120 is shown to be coupled between the interconnection 104 and the local memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include remote memory 130 coupled to the interconnect 104 via a remote memory interface 125. Hence, the remote memory interface 125 may control access by various components of system 100 to the remote memory 130. Furthermore, even though the remote memory interface 125 is shown to be directly coupled to the interconnection 104 in FIG. 6, the remote memory interface 125 can alternatively communicate via a memory bus interface (e.g., DDR4), a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the memory or storage bus is coupled to interconnect 104 via some other logic like a bus bridge, chipset, etc.) Additionally, the remote memory interface 125 may be incorporated into memory controller logic or provided on a same integrated circuit (IC) device in various embodiments (e.g., on the same circuit board device as the remote memory 130 or in the same enclosure as the remote memory 130).

Furthermore, the remote memory interface 125 and/or the remote memory 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, the remote memory 130, memory/storage bus, SATA bus, the remote memory interface 125, logic 160, etc., to sense variations in various factors affecting power/thermal behavior of the system/platform, such as temperature, operating frequency, operating voltage, power consumption, and/or inter-core communication activity, etc.

As illustrated in FIG. 6, the remote memory interface 125 may include logic 160, which may be in the same enclosure as the remote memory 130 and/or fully integrated on a printed circuit board (PCB) of the remote memory 130. The system 100 may include further logic 160 outside of the remote memory 130. One or more of the features/aspects/operations discussed with reference to FIGS. 1-5B may be performed by one or more of the components of FIG. 6. Also, one or more of the features/aspects/operations of FIGS. 1-5B may be programmed into firmware. Further, the memory controller 120 may also include logic 160. Advantageously, the logic 160 may include technology to implement one or more aspects of the system 10 (FIG. 1), the apparatus 15 (FIG. 2), the method 20 (FIGS. 3A to 3D), the virtualization environment 40 (FIG. 4, the method 50 (FIG. 5), and/or any of the features discussed herein.

In particular, the logic 160 may be configured to allocate a first memory portion to a first application as a combination of the local memory 114 and the remote memory 130 (e.g., where the remote memory 130 is shared between multiple compute nodes), and manage a first memory balloon associated with the first memory portion based on two or more memory tiers associated with the local memory 114 and the remote memory 130 (e.g., Tier 0 for the local memory 114, Tier 1 for a lowest latency portion of the remote memory 130, Tier 2 for a next lowest latency portion of the remote memory, and so on). In some embodiments, the logic 160 may be further configured to at least partially inflate the first memory balloon when the first application is initialized (e.g., or instantiated in the case of a virtual machine). Additionally, or alternatively, the logic 160 may be configured to allocate the first memory balloon to a particular memory tier of the two or more memory tiers associated with the local memory 114 and the remote memory 130 based on a performance characteristic associated with the first application. For example, the performance characteristic may correspond to one or more of a service level agreement (SLA) characteristic, a quality of service (QoS) characteristic, etc.

In some embodiments, the first application may correspond to a virtual machine (VM), and the logic 160 may be configured to virtually map a first amount of memory for the entire first memory portion for the VM when the VM is initialized, physically map a second amount of memory from the local memory 114 for the VM when the VM is initialized, where the second amount of memory is less than the first amount of memory, and inflate the first memory balloon based on a third amount of memory that remains to be physically mapped for the first portion of memory. Additionally, or alternatively, the logic 160 may be further configured to determine that the first application needs additional memory outside the first memory balloon, determine a preferred memory tier for the additional memory, and identify a second memory balloon associated with a second memory portion to provide the additional memory based on available memory from the second memory balloon in the preferred memory tier. For example, the logic 160 may also be configured to inflate the second memory balloon to free the available memory from the second memory portion, and allocate the freed available memory to the first memory portion for the additional memory. As shown in FIG. 6, features or aspects of the logic 160 may be distributed throughout the system 100, and/or co-located/integrated with various components of the system 100.

Additional Notes and Examples

Example 1 includes an electronic apparatus, comprising one or more substrates, and logic coupled to the one or more substrates, the logic to allocate a first memory portion to a first application as a combination of a local memory and remote memory, wherein the remote memory is shared between multiple compute nodes, and manage a first memory balloon associated with the first memory portion based on two or more memory tiers associated with the local memory and the remote memory.

Example 2 includes the apparatus of Example 1, wherein the logic is further to at least partially inflate the first memory balloon when the first application is initialized.

Example 3 includes the apparatus of any of Examples 1 to 2, wherein the first application corresponds to a VM, and wherein the logic is further to virtually map a first amount of memory for the entire first memory portion for the VM when the VM is initialized, physically map a second amount of memory from the local memory for the VM when the VM is initialized, where the second amount of memory is less than the first amount of memory, and inflate the first memory balloon based on a third amount of memory that remains to be physically mapped for the first portion of memory.

Example 4 includes the apparatus of any of Examples 1 to 3, wherein the logic is further to allocate the first memory balloon to a particular memory tier of the two or more memory tiers associated with the local memory and the remote memory based on a performance characteristic associated with the first application.

Example 5 includes the apparatus of Example 4, wherein the performance characteristic corresponds to one or more of a service level agreement characteristic and a quality of service characteristic.

Example 6 includes the apparatus of any of Examples 1 to 5, wherein the logic is further to determine that the first application needs additional memory outside the first memory balloon, determine a preferred memory tier for the additional memory, and identify a second memory balloon associated with a second memory portion to provide the additional memory based on available memory from the second memory balloon in the preferred memory tier.

Example 7 includes the apparatus of Example 6, wherein the logic is further to inflate the second memory balloon to free the available memory from the second memory portion, and allocate the freed available memory to the first memory portion for the additional memory.

Example 8 includes an electronic system, comprising a processor, a local memory communicatively coupled to the processor, and logic communicatively coupled to the processor and the local memory, the logic to allocate a first memory portion to a first application as a combination of the local memory and remote memory, wherein the remote memory is shared between multiple compute nodes, and manage a first memory balloon associated with the first memory portion based on two or more memory tiers associated with the local memory and the remote memory.

Example 9 includes the system of Example 8, wherein the logic is further to at least partially inflate the first memory balloon when the first application is initialized.

Example 10 includes the system of any of Examples 8 to 9, wherein the first application corresponds to a VM, and wherein the logic is further to virtually map a first amount of memory for the entire first memory portion for the VM when the VM is initialized, physically map a second amount of memory from the local memory for the VM when the VM is initialized, where the second amount of memory is less than the first amount of memory, and inflate the first memory balloon based on a third amount of memory that remains to be physically mapped for the first portion of memory.

Example 11 includes the system of any of Examples 8 to 10, wherein the logic is further to allocate the first memory balloon to a particular memory tier of the two or more memory tiers associated with the local memory and the remote memory based on a performance characteristic associated with the first application.

Example 12 includes the system of Example 11, wherein the performance characteristic corresponds to one or more of a service level agreement characteristic and a quality of service characteristic.

Example 13 includes the system of any of Examples 8 to 12, wherein the logic is further to determine that the first application needs additional memory outside the first memory balloon, determine a preferred memory tier for the additional memory, and identify a second memory balloon associated with a second memory portion to provide the additional memory based on available memory from the second memory balloon in the preferred memory tier.

Example 14 includes the system of Example 13, wherein the logic is further to inflate the second memory balloon to free the available memory from the second memory portion, and allocate the freed available memory to the first memory portion for the additional memory.

Example 15 includes a method of managing memory, comprising allocating a first memory portion to a first application as a combination of a local memory and remote memory, wherein the remote memory is shared between multiple compute nodes, and managing a first memory balloon associated with the first memory portion based on two or more memory tiers associated with the local memory and the remote memory.

Example 16 includes the method of Example 15, further comprising at least partially inflating the first memory balloon when the first application is initialized.

Example 17 includes the method of any of Examples 15 to 16, wherein the first application corresponds to a VM, further comprising virtually mapping a first amount of memory for the entire first memory portion for the VM when the VM is initialized, physically mapping a second amount of memory from the local memory for the VM when the VM is initialized, where the second amount of memory is less than the first amount of memory, and inflating the first memory balloon based on a third amount of memory that remains to be physically mapped for the first portion of memory.

Example 18 includes the method of any of Examples 15 to 17, further comprising allocating the first memory balloon to a particular memory tier of the two or more memory tiers associated with the local memory and the remote memory based on a performance characteristic associated with the first application.

Example 19 includes the method of Example 18, wherein the performance characteristic corresponds to one or more of a service level agreement characteristic and a quality of service characteristic.

Example 20 includes the method of any of Examples 15 to 19, further comprising determining if the first application needs additional memory outside the first memory balloon, determining a preferred memory tier for the additional memory, and identifying a second memory balloon associated with a second memory portion to provide the additional memory based on available memory from the second memory balloon in the preferred memory tier.

Example 21 includes the method of Example 20, further comprising inflating the second memory balloon to free the available memory from the second memory portion, and allocating the freed available memory to the first memory portion for the additional memory.

Example 22 includes at least one non-transitory one machine readable medium comprising a plurality of instructions that, in response to being executed on a computing device, cause the computing device to allocate a first memory portion to a first application as a combination of a local memory and remote memory, wherein the remote memory is shared between multiple compute nodes, and manage a first memory balloon associated with the first memory portion based on two or more memory tiers associated with the local memory and the remote memory.

Example 23 includes the at least one non-transitory one machine readable medium of Example 22, comprising a plurality of further instructions that, in response to being executed on the computing device, cause the computing device to at least partially inflate the first memory balloon when the first application is initialized.

Example 24 includes the at least one non-transitory one machine readable medium of any of Examples 22 to 23, wherein the first application corresponds to a VM, comprising a plurality of further instructions that, in response to being executed on the computing device, cause the computing device to virtually map a first amount of memory for the entire first memory portion for the VM when the VM is initialized, physically map a second amount of memory from the local memory for the VM when the VM is initialized, where the second amount of memory is less than the first amount of memory, and inflate the first memory balloon based on a third amount of memory that remains to be physically mapped for the first portion of memory.

Example 25 includes the at least one non-transitory one machine readable medium of any of Examples 22 to 24, comprising a plurality of further instructions that, in response to being executed on the computing device, cause the computing device to allocate the first memory balloon to a particular memory tier of the two or more memory tiers associated with the local memory and the remote memory based on a performance characteristic associated with the first application.

Example 26 includes the at least one non-transitory one machine readable medium of Example 25, wherein the performance characteristic corresponds to one or more of a service level agreement characteristic and a quality of service characteristic.

Example 27 includes the at least one non-transitory one machine readable medium of any of Examples 22 to 26, comprising a plurality of further instructions that, in response to being executed on the computing device, cause the computing device to determine that the first application needs additional memory outside the first memory balloon, determine a preferred memory tier for the additional memory, and identify a second memory balloon associated with a second memory portion to provide the additional memory based on available memory from the second memory balloon in the preferred memory tier.

Example 28 includes the at least one non-transitory one machine readable medium of Example 27, comprising a plurality of further instructions that, in response to being executed on the computing device, cause the computing device to inflate the second memory balloon to free the available memory from the second memory portion, and allocate the freed available memory to the first memory portion for the additional memory.

Example 29 includes a memory managing apparatus, comprising means for allocating a first memory portion to a first application as a combination of a local memory and remote memory, wherein the remote memory is shared between multiple compute nodes, and means for managing a first memory balloon associated with the first memory portion based on two or more memory tiers associated with the local memory and the remote memory.

Example 30 includes the apparatus of Example 29, further comprising means for at least partially inflating the first memory balloon when the first application is initialized.

Example 31 includes the apparatus of any of Examples 29 to 30, wherein the first application corresponds to a VM, further comprising means for virtually mapping a first amount of memory for the entire first memory portion for the VM when the VM is initialized, means for physically mapping a second amount of memory from the local memory 12 for the VM when the VM is initialized, where the second amount of memory is less than the first amount of memory, and means for inflating the first memory balloon based on a third amount of memory that remains to be physically mapped for the first portion of memory.

Example 32 includes the apparatus of any of Examples 29 to 31, further comprising means for allocating the first memory balloon to a particular memory tier of the two or more memory tiers associated with the local memory and the remote memory based on a performance characteristic associated with the first application.

Example 33 includes the apparatus of Example 32, wherein the performance characteristic corresponds to one or more of a service level agreement characteristic and a quality of service characteristic.

Example 34 includes the apparatus of any of Examples 29 to 33, further comprising means for determining if the first application needs additional memory outside the first memory balloon, means for determining a preferred memory tier for the additional memory, and means for identifying a second memory balloon associated with a second memory portion to provide the additional memory based on available memory from the second memory balloon in the preferred memory tier.

Example 35 includes the apparatus of Example 34, further comprising means for inflating the second memory balloon to free the available memory from the second memory portion, and means for allocating the freed available memory to the first memory portion for the additional memory.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:

one or more substrates; and logic coupled to the one or more substrates, the logic to:

allocate a first memory portion to a first application as a combination of a main memory of a compute node and re-allocatable pooled memory, wherein the re-allocatable pooled memory is shared between multiple compute nodes, and manage a first memory allocation amount associated with the first memory portion based on two or more memory tiers associated with the main memory and the re-allocatable pooled memory.

2. The apparatus of claim 1, wherein the logic is further to:

initialize the first memory allocation amount to an amount that is less than an amount of memory for the entire first memory portion when the first application is first initialized.

3. The apparatus of claim 1, wherein the first application corresponds to a virtual machine, and wherein the logic is further to:

virtually map a first amount of memory for the entire first memory portion for the virtual machine when the virtual machine is instantiated;

physically map a second amount of memory from the main memory for the virtual machine when the virtual machine is instantiated, wherein the second amount of memory is less than the first amount of memory; and initialize the first memory allocation amount based on a third amount of memory that remains to be physically mapped for the first portion of memory.

4. The apparatus of claim 1, wherein the logic is further to:

allocate the first memory allocation amount to a particular memory tier of the two or more memory tiers associated with the main memory and the re-allocatable pooled memory based on a performance characteristic associated with the first application.

5. The apparatus of claim 1, wherein the logic is further to:

maintain information that associates respective performance values with one or more tiers of the two or more memory tiers; and in response to a decrease of the first memory allocation amount, map one or more pages of the first memory allocation amount to a particular tier of the two or more memory tiers based on an evaluation of a performance characteristic associated with the first application relative to the respective performance values.

6. The apparatus of claim 1, wherein the logic is further to:

determine that the first application needs additional memory outside the first memory allocation amount;

determine a preferred memory tier for the additional memory; and identify a second memory allocation amount associated with a second memory portion to provide the additional memory based on available memory from the second memory allocation amount in the preferred memory tier.

7. The apparatus of claim 6, wherein the logic is further to:

increase the second memory allocation amount to free the available memory from the second memory portion; and allocate the freed available memory to the first memory portion for the additional memory.

8. An electronic system, comprising:

a processor;

a local memory communicatively coupled to the processor; and logic communicatively coupled to the processor and the local memory, the logic to:

allocate a first memory portion to a first application as a combination of the local memory and remote memory, wherein the remote memory is remote with respect to the local memory and shared between multiple compute nodes, and manage a first memory allocation amount associated with the first memory portion based on two or more memory tiers associated with the local memory and the remote memory.

9. The system of claim 8, wherein the first application corresponds to a virtual machine, and wherein the logic is further to:

initialize the first memory allocation amount to an amount that is less than an amount of memory for the entire first memory portion when the virtual machine is instantiated.

10. The system of claim 8, wherein the first application corresponds to a virtual machine, and wherein the logic is further to:

virtually map a first amount of memory for the entire first memory portion for the virtual machine when the virtual machine is instantiated;

physically map a second amount of memory from the local memory for the virtual machine when the virtual machine is instantiated, wherein the second amount of memory is less than the first amount of memory; and initialize the first memory allocation amount based on a third amount of memory that remains to be physically mapped for the first portion of memory.

11. The system of claim 8, wherein the logic is further to:

maintain a table that maps respective performance values with each tier of the two or more memory tiers; and in response to a decrease of the first memory allocation amount, determine a particular tier of the two or more memory tiers based on an evaluation of a performance characteristic associated with the first application relative to the respective performance values in the table, and physically map one or more pages of the first memory allocation amount to the particular tier.

12. The system of claim 11, wherein the local memory comprises main memory and wherein the remote memory comprises remote re-allocatable pooled memory.

13. The system of claim 8, wherein the logic is further to:

determine that the first application needs additional memory outside the first memory allocation amount;

determine a preferred memory tier for the additional memory; and identify a second memory allocation amount associated with a second memory portion to provide the additional memory based on available memory from the second memory allocation amount in the preferred memory tier.

14. The system of claim 13, wherein the logic is further to:

increase the second memory allocation amount to free the available memory from the second memory portion; and allocate the freed available memory to the first memory portion for the additional memory.

15. A method of managing memory, comprising:

allocating a first memory portion to a first application as a combination of a local memory of a compute node and re-allocatable pooled memory, wherein the re-allocatable pooled memory is shared between multiple compute nodes; and managing a first memory allocation amount associated with the first memory portion based on two or more memory tiers associated with the local memory and the re-allocatable pooled memory.

16. The method of claim 15, further comprising:

initialize the first memory allocation amount to an amount that is less than an amount of memory for the entire first memory portion when the first application is first initialized.

17. The method of claim 15, wherein the first application corresponds to a virtual machine, further comprising:

virtually mapping a first amount of memory for the entire first memory portion for the virtual machine when the virtual machine is instantiated;

physically mapping a second amount of memory from the local memory for the virtual machine when the virtual machine is instantiated, wherein the second amount of memory is less than the first amount of memory; and initializing the first memory allocation amount based on a third amount of memory that remains to be physically mapped for the first portion of memory.

18. The method of claim 15, further comprising:

allocating the first memory allocation amount to a particular memory tier of the two or more memory tiers associated with the local memory and the re-allocatable pooled memory based on a performance characteristic associated with the first application.

19. The method of claim 15, further comprising, in response to a request to initialize the first application with a first amount of memory for the first memory portion:

allocating a second amount of memory from the local memory, where the second amount is less than the first amount;

allocating a third amount of memory from the remote memory, where the third amount is less than or equal to a difference between the first amount and the second amount;

managing the third amount of memory with the first memory allocation amount; and initializing the first memory allocation amount based on the third amount of memory.

20. The method of claim 15, further comprising:

determining if the first application needs additional memory outside the first memory allocation amount;

determining a preferred memory tier for the additional memory; and identifying a second memory allocation amount associated with a second memory portion to provide the additional memory based on available memory from the second memory allocation amount in the preferred memory tier.

* * * * *